C. Wack,
Back-Band Hook,
Nº 80,373. Patented July 28, 1868.
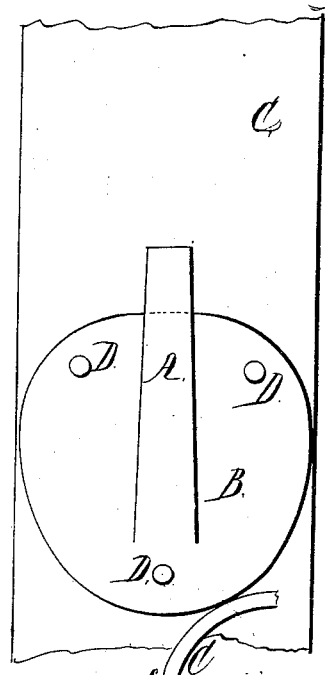
Fig. 1.
Fig. 2.
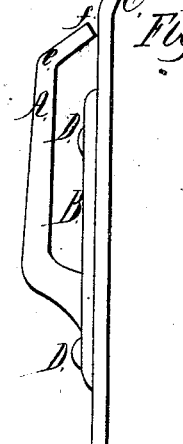
Wm A Morgan
G. L. Cotton
Inventor;
C. Wack
per Munn & Co.
Attorneys.

United States Patent Office.

CHARLES WACK, OF EVANSVILLE, INDIANA, ASSIGNOR TO HIMSELF, CHARLES MILLER, AND A. STEINBACH, OF SAME PLACE.

Letters Patent No. 80,373, dated July 28, 1868.

IMPROVED BACK-BAND HOOK.

*The Schedule referred to in these Letters Patent and making part of the same.*

TO ALL WHOM IT MAY CONCERN:

Be it known that I, CHARLES WACK, of Evansville, in the county of Vanderburg, and State of Indiana, have invented a new and useful Improvement in Back-Band Hooks; and I do hereby declare that the following is a full, clear, and exact description thereof, which will enable those skilled in the art to make and use the same, reference being had to the accompanying drawings, forming part of this specification.

This invention relates to harness used on horses for plowing and other purposes, and consists in forming the hook in such a manner that the chain, which it supports, is securely kept in place when in use, as will be hereinafter described.

Figure 1 represents an outside view of the hook, attached to the back-band by rivets.

Figure 2 is an edge view of the same.

Similar letters of reference indicate corresponding parts.

This hook, A, is cut on to a plate, B.

C is the leather band.

D are the rivets, by which the hook-plate B is attached to the band.

The band C passes over the horse's back, and the hooks of course hang down upon each side.

The draught-chains are supported or held by the hook.

As these hooks have usually been made, they terminated at the point $e$, and much inconvenience has been experienced when in use, (for plowing and for other purposes,) in consequence of the liability of the chain to slip off the hook.

I have discovered that by making an elbow at the point $e$, and extending the hook, (inclined inward, as represented,) so that when the leather band is straightened out, its extreme end, $f$, will touch or come in contact with the band, the chain is securely kept in place or prevented from slipping off, and much trouble and annoyance are avoided.

I claim as new, and desire to secure by Letters Patent—

As a new article of manufacture, the back-band hook, constructed as described, of the plate B, cast or formed with the hook A, whose upper portion is bent in at $e\ f$, said plate being adapted for riveting to the strap C, as herein shown and described, for the purpose specified.

CHARLES WACK.

Witnesses:
J. L. KNAUSS,
E. ANDEL.